(12) United States Patent
Guruaribam (10) Patent No.: US 11,877,077 B2
(45) Date of Patent: Jan. 16, 2024

(54) IMAGE SENSOR WITH BLACK LEVEL CORRECTION

(71) Applicant: SEMICONDUCTOR COMPONENTS INDUSTRIES, LLC, Phoenix, AZ (US)

(72) Inventor: Debashree Guruaribam, Boise, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 527 days.

(21) Appl. No.: 17/247,590

(22) Filed: Dec. 17, 2020

(65) Prior Publication Data

US 2022/0201229 A1 Jun. 23, 2022

(51) Int. Cl.
| | | |
|---|---|---|
| *H04N 25/671* | (2023.01) | |
| *H04N 25/40* | (2023.01) | |
| *H04N 25/53* | (2023.01) | |
| *H04N 25/57* | (2023.01) | |
| *H04N 25/75* | (2023.01) | |
| *H04N 25/621* | (2023.01) | |
| *H04N 25/633* | (2023.01) | |
| *H04N 25/771* | (2023.01) | |
| *H04N 25/63* | (2023.01) | |

(52) U.S. Cl.
CPC ........... *H04N 25/671* (2023.01); *H04N 25/40* (2023.01); *H04N 25/53* (2023.01); *H04N 25/57* (2023.01); *H04N 25/621* (2023.01); *H04N 25/633* (2023.01); *H04N 25/75* (2023.01); *H04N 25/771* (2023.01); *H04N 25/63* (2023.01)

(58) Field of Classification Search
CPC .... H04N 25/633; H04N 25/671; H04N 25/40; H04N 25/53; H04N 25/57; H04N 25/621; H04N 25/75; H04N 25/771; H04N 25/63; H04N 25/778
See application file for complete search history.

(56) References Cited

U.S. PATENT DOCUMENTS

| | | | |
|---|---|---|---|
| 2008/0297816 A1 | 12/2008 | Nikkanen et al. | |
| 2014/0014818 A1 | 1/2014 | Cho et al. | |
| 2016/0286142 A1* | 9/2016 | Chou | H04N 25/63 |
| 2019/0191112 A1* | 6/2019 | Shigiya | H04N 25/533 |
| 2020/0099875 A1* | 3/2020 | Mikes | H04N 25/633 |
| 2020/0169677 A1* | 5/2020 | Johnson | H04N 25/585 |

\* cited by examiner

*Primary Examiner* — Kelly L Jerabek
(74) *Attorney, Agent, or Firm* — Treyz Law Group, P.C.; Tianyi He (57) ABSTRACT

An image sensor may include an image sensor pixel array, row control circuitry, and column readout circuitry. The array may include first and second sets of active pixels that are configured in different manners or controlled by the row control circuitry and column readout circuitry in different manners. The array may include optically black pixels that have photosensitive elements shield from incident light. The optically black pixels may be configured to generate first and second sets of black level signals adapted to both the first and second sets of active pixels. The corresponding sets of black level signals may be used to better reduce noise in corresponding sets of image signals generated by the first and second sets of active pixels.

20 Claims, 5 Drawing Sheets

IMAGE SENSOR WITH BLACK LEVEL CORRECTION

BACKGROUND

This relates generally to imaging systems and more specifically to image sensors having black level correction capabilities.

A typical image sensor includes active image sensor pixels that generate image signals in response to incident light. To compensate for non-idealities such as dark current in the process of generating the image signals, the image sensor can include optically black pixels (sometimes referred to herein as dark pixels). The optically black pixels generate black level signals that are used to compensate or correct for the non-idealities such as dark current in the image signals.

However, in some applications, different active pixels across the array can operate in different conditions. Because the typical black level signals are generically generated, they fail to account for the differences in operating conditions of the different active pixels. As such, the image signals generated by the different active pixels under different operating conditions are compensated in the same manner using the same set of black level signals. This leads to inaccurate black level correction at least for some of the image signals and can lead to visible artifacts in the generated image (e.g., banding or discontinuities in the image).

It is within this context that the embodiments herein arise.

DETAILED DESCRIPTION

Electronic devices such as digital cameras, computers, cellular telephones, and other electronic devices may include image sensors that gather incoming light to capture an image (e.g., an image frame). The image sensors may include arrays of image sensor pixels. The pixels in the image sensors may include photosensitive elements such as photosensitive elements that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
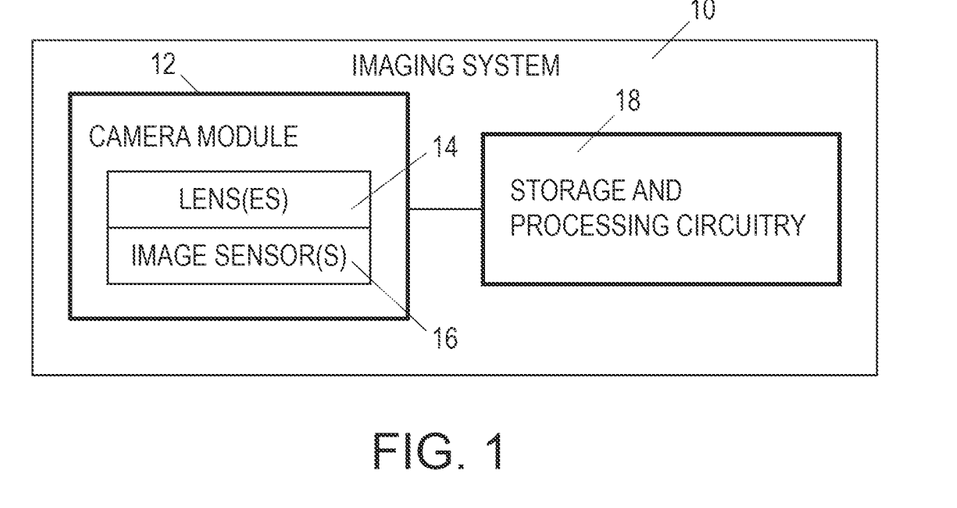
FIG. 1 is a diagram of an illustrative imaging system having an image sensor and processing circuitry in accordance with some embodiments.

FIG. 1 is a diagram of an illustrative imaging system such as an electronic device that uses an image sensor to capture images. Imaging system 10 of FIG. 1 may be a portable electronic device such as a camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures digital image data. Camera module 12 (sometimes referred to as an imaging module) may be used to convert incoming light into digital image data. Camera module 12 may include one or more lenses 14 and one or more corresponding image sensors 16. During image capture operations, light from a scene may be focused onto image sensor 16 by lenses 14. Image sensor 16 may include circuitry for converting analog pixel image signals into corresponding digital image data that is provided to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module (e.g., circuits that form part of an integrated circuit that includes image sensors 16 or an integrated circuit within the module that is associated with image sensors 16). When storage and processing circuitry 18 is included on different integrated circuits than those of image sensors 16, the integrated circuits with circuitry 18 may be vertically stacked or packaged with respect to the integrated circuits with image sensors 16. Image data that has been captured by the camera module may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Figure 2:
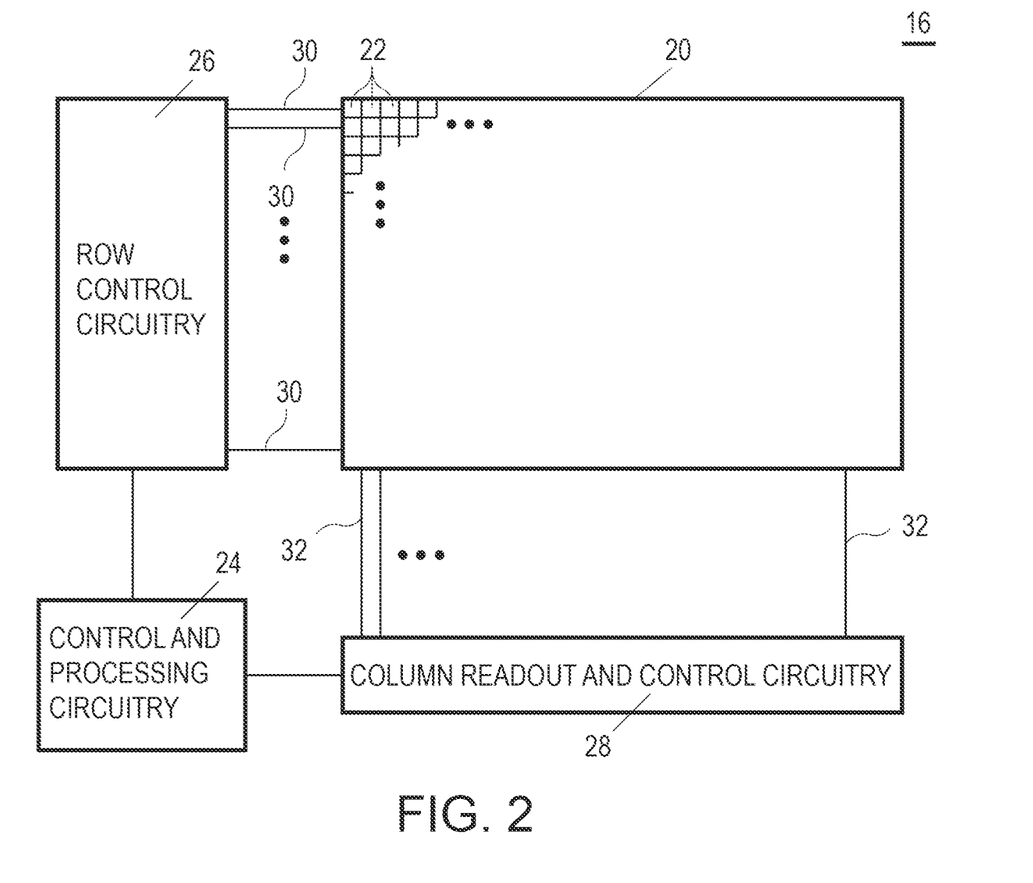
FIG. 2 is a diagram of an illustrative image sensor having a pixel array and corresponding control and readout circuitry in accordance with some embodiments.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 (sometimes referred to as row driver circuitry) and column readout and control circuitry 28 (sometimes referred to as column readout circuitry or column control circuitry, readout circuitry, or column decoder circuitry). Row control circuitry 26 may receive row addresses from control circuitry 24 and supply corresponding row control signals such as reset, anti-blooming, row select, charge transfer, dual conversion gain mode, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and an image signal generated by each corresponding image pixel 22 in that pixel row can be read out along a respective column line 32.

Column readout circuitry 28 may receive image signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry or a multiplier circuit, analog to digital conversion (ADC) circuitry, bias circuitry, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Column readout circuitry 28 may supply digital pixel data to control and processing circuitry 24 and/or processor 18 (FIG. 1) for pixels in one or more pixel columns.

Pixel array 20 may also be provided with a filter array having multiple (color) filter elements (each corresponding to a respective pixel) which allows a single image sensor to sample light of different colors or sets of wavelengths. As an example, image sensor pixels such as the image pixels in array 20 may be provided with a color filter array having red, green, and blue filter elements, which allows a single image sensor to sample red, green, and blue (RGB) light using corresponding red, green, and blue image sensor pixels arranged in a Bayer mosaic pattern.

In other suitable examples, the green pixels in a Bayer pattern may be replaced by broadband image pixels having broadband color filter elements (e.g., clear color filter elements, yellow color filter elements, etc.), or one of the green pixels in a Bayer pattern may be replaced by infrared (IR) image pixels formed under IR color filter elements and/or the remaining red, green, and blue image pixels may also be sensitive to IR light (e.g., may be formed under filter elements that pass IR light in addition to light of their respective colors). These examples are merely illustrative and, in general, filter elements of any desired color and/or wavelength and in any desired pattern may be formed over any desired number of image pixels 22.

Image sensor 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices technology. Image pixels 22 may be frontside illumination (FSI) image pixels or backside illumination (BSI) image pixels. If desired, image sensor 16 may include an integrated circuit package or other structure in which multiple integrated circuit substrate layers or chips are vertically stacked with respect to each other.

In some configurations described herein as illustrative examples, image sensor 16 may be configured to support a global shutter operation (e.g., pixels 22 may be operated in a global shutter mode). For example, image pixels 22 in array 20 may each include at least a photodiode, a floating diffusion region, and a corresponding local charge storage region. With a global shutter control scheme, all of the pixels in the image sensor are reset simultaneously to begin an integration time period. At the end of the integration time period, a charge transfer operation is then used to simultaneously transfer the charge collected in the photodiode of each image pixel during the integration time period to a corresponding local charge storage region for the photodiode. Data from each local charge storage region may then be transferred to a corresponding floating diffusion region and read out on a per-row basis, for example.

Figure 3:
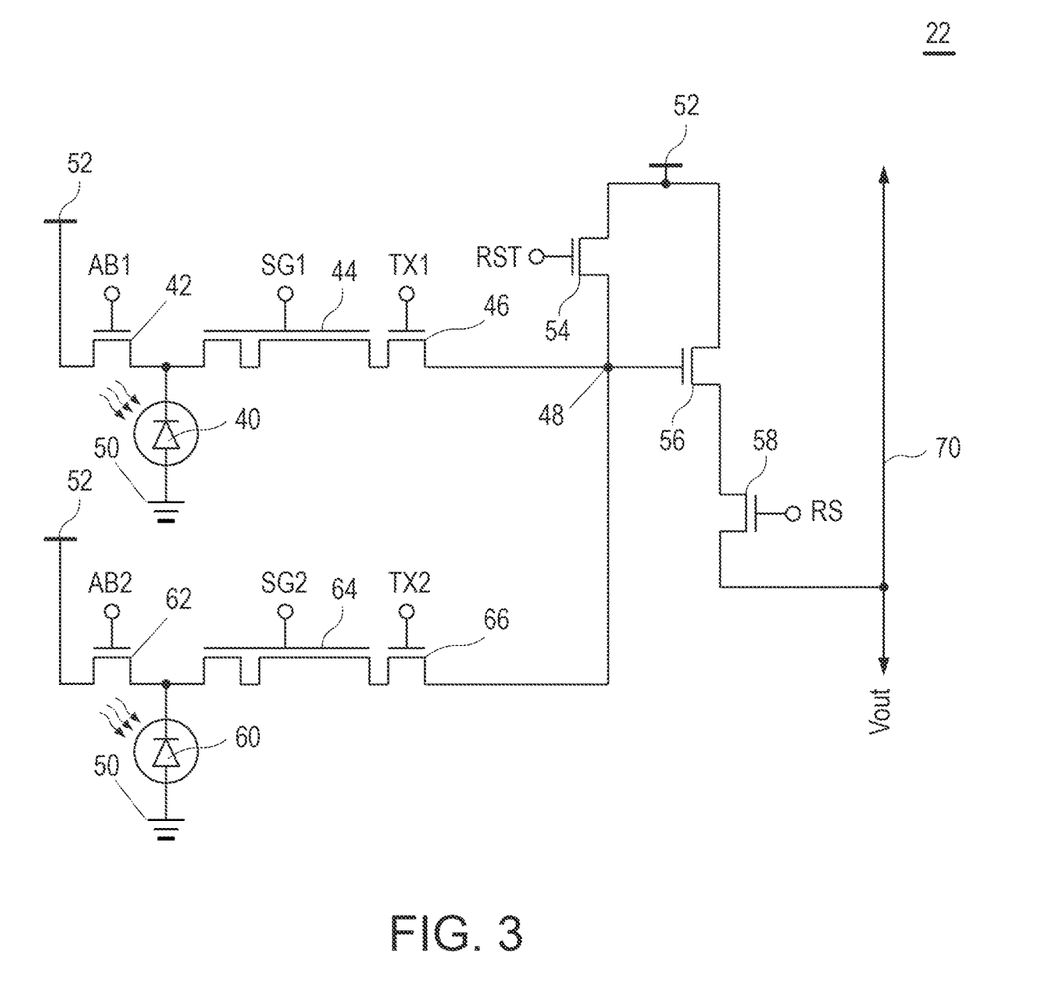
FIG. 3 is a circuit diagram of an illustrative image sensor pixel in accordance with some embodiments.

FIG. 3 is a circuit diagram of an illustrative image sensor pixel 22. Pixel 22 may include photosensitive element 40 (e.g., photodiode 40). Photodiode 40 may receive incident light over a period of time (e.g., an integration time period or an exposure time period) and may generate electric charge based on the incident light. A first terminal of photodiode 40 may be coupled to a voltage terminal 50 such as a ground voltage source. An anti-blooming transistor 42 may couple photodiode 40 (e.g., a second terminal of photodiode 40) to a voltage terminal 52 such as a supply voltage source. Transistor 42 may be configured to prevent blooming at photodiode 40 and/or may serve to keep photodiode 40 at a reset voltage level (e.g., the supply voltage level). As an example, when control signal AB1 is asserted (e.g., at a logic high to turn on transistor 42), photodiode 50 may be reset to the supply voltage level. When control signal AB1 is deasserted (e.g., at a logic low to turn off transistor 42), photodiode 40 may begin to accumulate charge in response to incident light.

Pixel 22 may include a (local) charge storage region such as storage gate 44 coupled to the photodiode 40 (e.g., the second terminal of photodiode 40). As an example, storage gate 44 may include a corresponding charge transfer transistor and a corresponding charge storage region. Control signal SG1 may be adjusted to control the flow of charge from photodiode 40 into the charge storage region associated with storage gate 44. As an example, storage gate 44 may temporarily store image charge generated at photodiode 40 prior to transferring the image charge to a floating diffusion region for readout (e.g., per a global shutter mode of operation). The use of storage gate 44 in pixel 22 is merely illustrative. If desired, other (types of) charge storage regions may be used instead of or in addition to storage gate 44.

Pixel 22 may include floating diffusion region 48 having an associated charge storage capacity (capacitance). As an example, floating diffusion region 48 may be implemented as a doped semiconductor region (e.g., a region in a silicon substrate that is doped by ion plantation, impurity diffusion, or other doping processes). Transfer transistor 46 may couple storage gate 44 to floating diffusion region 48. During readout operations, transfer transistor 46 may transfer image charge from storage gate 44 to floating diffusion region 48 for readout. A reset transistor 54 may couple floating diffusion region 48 to a voltage terminal 52 such as a supply voltage source. As an example, when control signal RST is asserted, floating diffusion region 48 may be reset to a reset voltage level (e.g., the supply voltage level). If desired, transistor 54 (in combination with other transistors) may be used to reset other portions of pixel 22 (e.g., storage gate 44, storage gate 64, an overflow capacitor if implemented, photodiode 40, etc.) to the reset voltage level.

Pixel 22 may include source follower transistor 56 and row select transistor 58 (sometimes collectively referred to herein as pixel readout circuitry). Source follower transistor 56 has a gate terminal coupled to floating diffusion region 48, a first source-drain terminal (e.g., one of a source or drain terminal) coupled to voltage terminal 52, and a second source-drain terminal (e.g., the other one of the source or drain terminal) coupled to row select transistor 58. Transistor 58 may have a gate terminal that is controlled by row select control signal RS. When control signal RS is asserted (e.g., during a pixel row readout operation when reset and/or image level signals from pixels in a given row that includes pixel 22 are being read out), a pixel output signal Vout may be passed onto path 70 (e.g., column line 32 in FIG. 2). Pixel output signal Vout may be an output signal having a magnitude that is proportional to the amount of charge at floating diffusion region 48.

Pixel 22 may also include photodiode 60, anti-blooming transistor 62, storage gate 64, and transfer transistor 66 implemented in an analogous manner to photodiode 40, anti-blooming transistor 42, storage gate 44, and transfer transistor 46 and coupled to floating diffusion region 48 along a separate path (e.g., separate from the path along which photodiode 40, anti-blooming transistor 42, storage gate 44, and transfer transistor 46 are coupled).

The configuration of pixel 22 shown in FIG. 3 is merely illustrative. If desired, pixel 22 in FIG. 3 may include one or more suitable additional elements (e.g., one or more overflow capacitors, one or more photosensitive elements, one or more transistors to make desirable connections, etc.), may exclude one or more suitable elements (e.g., photodiode 60, anti-blooming transistor 62, storage gate 64, transfer transistor 66, etc.), and/or may replace one or more suitable elements (e.g., replace storage gate 44 with other types of charge storage structures and transistors, omit photodiode 60 and transistor 62 but couple the second terminal of photodiode 40 to storage gate 64, etc.).

Configurations in which an image sensor pixel array such as array 20 in FIG. 2 includes pixels 22 each having the implementation shown in FIG. 3 are described herein as illustrative examples. If desired, the embodiments described herein may similarly apply to an array having pixels of other implementations (e.g., implemented in a different manner than pixel 22 in FIG. 3).

An image pixel array such as array 20 in FIG. 2 may include not only active pixels that generate image signals for one or more image frames, but also optically black pixels (sometimes referred to herein as optically shielded pixels or dark pixels). The optically black pixels may have the same pixel configuration as the active pixels in the array. As an example, both the active pixels and the optically black pixels may have the pixel configuration of pixel 22 in FIG. 3. While the photosensitive elements (e.g., photodiodes 40 and 60 in FIG. 3) in the active pixels generate image charge in response to incident light, all of the photosensitive elements (e.g., photodiodes 40 and 60 in FIG. 3) in the optically black pixels may be optically shielded from incident light (e.g., may not receive any incident light and may therefore generate charge based on dark current and not generate any charge in response to incident light). The optically black pixels may still be operated in a similar manner as the active pixels and may generate corresponding black level signal (based on the generated dark current charge) that are used to compensate for dark current (e.g., dark current noise in the image signals generated by the active pixels), thereby providing black level correction for the image signals.

Figure 4:
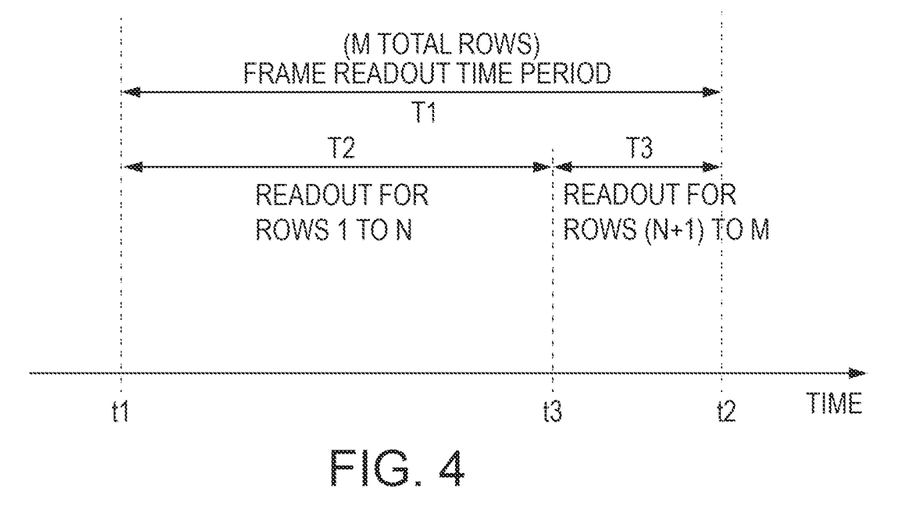
FIG. 4 is a timing diagram of illustrative time periods for performing image signal readout operations for an image frame in accordance with some embodiments.

However, in some applications, active pixels in an image sensor array may not operate in the same operating conditions or environment (e.g., may be receive control signals in the same control scheme). As such, generically generated black level signals from optically black pixels may be unable to properly correct for dark current noise or other noise specific to image signals generated by multiple different sets or segments of image pixels operating in different corresponding conditions. FIG. 4 is a timing diagram of illustrative readout operations for generating a given image frame using an image sensor pixel array operating in a global shutter mode. Row control circuitry 26 and column readout circuitry 28 (FIG. 2) may operate in combination to control the image sensor pixel array to perform these readout operations.

In the example of FIG. 4, the illustrative array may include M number of active pixel rows. During time period T1 (from time t1 to time t3), image signals from corresponding active pixels in each row may be read out in a row-by-row manner (e.g., reading out signals from active pixels in row 1, then active pixels in row 2, then active pixels in row 3, . . . , and lastly from active pixels in row M).

In particular, at and/or before time t1 (e.g., to prepare for the readout operations for the given image frame in time period T1), row control circuitry 26 (FIG. 2) may globally reset floating diffusion regions in active pixels across the array (e.g., assert and deassert corresponding control signals for all active pixels to reset all floating diffusion regions to a reset voltage level such as the supply voltage level). Using the example of FIG. 3, row control circuitry 26 may assert signal RST (e.g., a global signal RST controlling each active pixel 22 in the entire array) to reset floating diffusion region 48 to the supply voltage level provided by voltage terminal 52 for each pixel in the entire array.

Additionally, at and/or before time t1 (e.g., to prepare for the readout operations for the given image frame in time period T1), row control circuitry 26 may globally reset local charge storage regions in active pixels across the array (e.g., assert and deassert corresponding control signals for all active pixels to reset all local charge storage regions to a reset voltage level such as the supply voltage level). Using the example of FIG. 3, row control circuitry 26 may assert signals RST, TX1, and TX2 (e.g., global signals RST, TX1, and TX2 controlling each active pixel 22 in the entire array) to reset local charge storage regions 44 and 64 to the supply voltage level provided by voltage terminal 52 for each pixel in the entire array.

Furthermore, at and/or before time t1 (e.g., to prepare for the readout operations for the given image frame in time period T1), row control circuitry 26 may globally transfer image charge associated with the given image frame from corresponding photodiodes to respective local charge storage regions in each active pixel in the array (e.g., assert and deassert corresponding control signals for all active pixels to transfer image charge associated with the given image frame from the corresponding photodiodes to respective local charge storage regions). This charge transfer process may occur after the global reset of the local charge storage region and after the end of the integration time period for the given image frame. Using the example of FIG. 3, row control circuitry 26 may assert signals SG1 and SG2 (e.g., global signals SG1 and SG2 controlling each active pixel 22 in the entire array) to transfer corresponding image charges stored at photodiodes 40 and 60 to local charge storage region 44 and 64 for each pixel in the entire array. In this illustrative example, signals generated by photodiodes 40 and 60 may be used for a single image frame.

After performing the above operations, each active pixel in the entire array may store the image charge(s) at one or more local charge storage region(s) and may have a floating diffusion region at a reset voltage level. Thereafter, row control circuitry 26 and column readout circuitry 28 (FIG. 2) may begin performing the row-wise readout operations during time period T1 (beginning at time 0). During these readout operations and while the photodiodes in the array are not generating image charge, it may be desirable to prevent blooming of the photodiodes by asserting the corresponding anti-blooming transistors (e.g., asserting transistors 42 and 62 to a high voltage for photodiodes 40 and 60).

To provide fast frame rate, it may be desirable to begin the integration time period for the subsequent image frame during the readout operations of the current image frame. During the integration time period for the subsequent image frame, the corresponding anti-blooming transistors may have to be deasserted (e.g., periodically or continuously) in order to properly accumulate charge at the corresponding photodiodes. In the example of FIG. 4, the beginning of the integration time period for the subsequent image frame may be at time t3.

This difference in the state of anti-blooming transistors during the readout operation time period (e.g., before time t3 and after time t3) can contribute to differences in operating conditions between different pixels (e.g., pixels in rows read out before time t3 and pixels in rows read out after time t3). In the example of FIG. 4, image signals from any pixel in rows 1 to N may be read out while the one or more corresponding anti-blooming transistors in that pixel are asserted, and signals from any pixel in rows (N+1) to M may be read out while the one or more corresponding anti-blooming transistors in that pixel are deasserted. Active pixels that are read out during time period T2 before time t3 may be referred to herein as active pixels in a first segment, read out in a first operating condition (e.g., with one or more asserted anti-blooming transistors). Active pixels that are read out during time period T3 after time t3 may be referred to herein as active pixels in a second segment, read out under a second operating condition (e.g., with one or more deasserted anti-blooming transistors).

Figure 5:
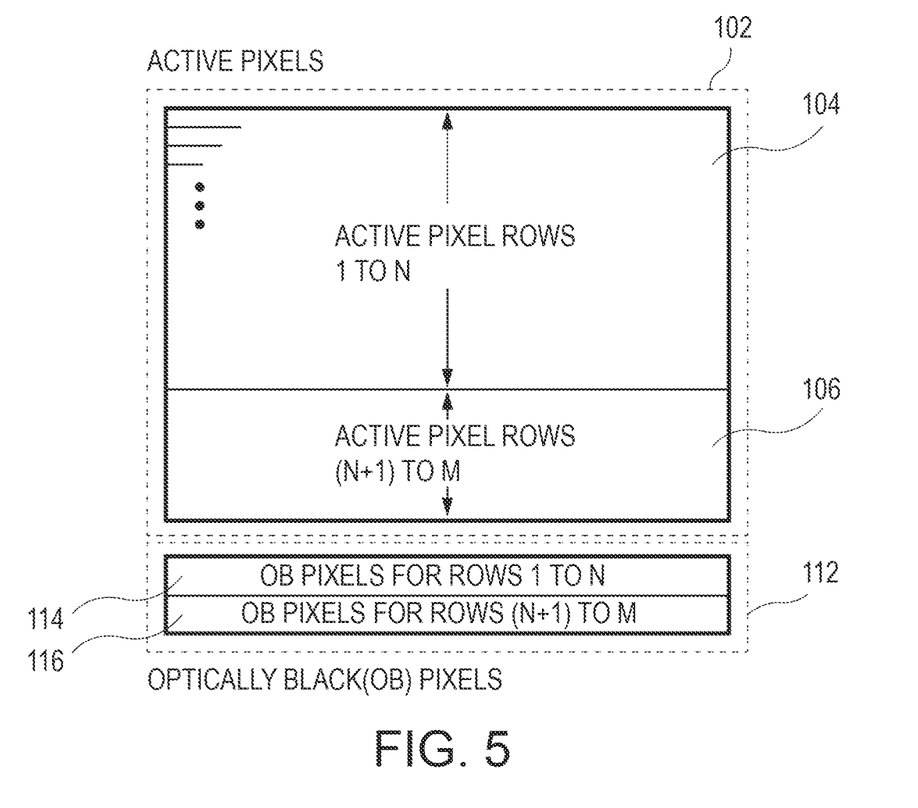
FIG. 5 is a diagram of illustrative portions of optically black pixels for corresponding sets of rows of active pixels in accordance with some embodiments.

While an image sensor pixel array can include optically black pixels that generate black level signals that generally compensate for dark current noise in the image signals, these black level signals fail to fully account for the different segments of active pixels that operate in different conditions to generate these image signals. FIG. 5 is a diagram of illustrative optically pixels that are adaptively configured to flexibly compensate for image signals generated (e.g., read out) under different operating conditions from different segments of active pixels.

As shown in FIG. 5, active pixels 102 may be organized in rows and columns of active pixels. In order to not obscure the current embodiments, only the corresponding pixel rows have been depicted and labeled in FIG. 5. In particular, active pixels 102 may form active pixel rows 1 to N (sometimes referred to herein as active pixel segment 104 or active pixel portion 104) and active pixel rows (N+1) to M (sometimes referred to herein as active pixel segment 106 or active pixel portion 106).

Each segment of active pixels may be associated with a corresponding set of optically black (OB) pixels. As shown in FIG. 5, OB pixels 112 may similarly be organized in rows and columns of OB pixels. In particular, OB pixels 112 may be organized in OB pixel segment or portion 114 and OB pixel segment or portion 116. OB pixel portions 114 and 116 may each include one or more OB pixel rows (e.g., a single row of OB pixels, two rows of OB pixels, etc.), if desired. OB pixel rows may have the same number of columns as active pixel rows, if desired.

As an example, OB pixel portion 114 may be a single row of OB pixels 112. Each OB pixel 112 in portion 114 may generate a corresponding black level signal that is used to compensate for dark current noise in one or more image signals generated by active pixels in portion 104 (e.g., in the same column as the corresponding OB pixel 112). Similarly, OB pixel portion 116 may be a single row of OB pixels 112. Each OB pixel 112 in portion 116 may generate a corresponding black level signal that used to compensate for dark current noise in one or more image signals generated by active pixels in portion 106 (e.g., in the same column as the corresponding OB pixel 112). These examples are merely illustrative. If desired, each OB portion may include more than one pixel row, less than one pixel row, etc. If desired, each black level signal may be used to compensate for dark current noise in any suitable corresponding image signal. If desired, black level signals generated by multiple OB pixels may be processed (e.g., averaged) to generate a modified or improved black level signal for performing black level correction.

Active pixels 102 (in portions 104 and 106) and OB pixels 112 (in portions 114 and 116) may each have the same implementation (e.g., may have the same pixel configuration of pixel 22 in FIG. 3). As described in connection with FIG. 4, while each active pixel 102 may generate an image signal in response to incident light, each OB pixel 112 may be optically shielded from incident light and may generate a black level signal. In particular each OB pixel 112 may use its optically shielded photodiode to gather dark current charge, perform the same type of charge transfer operations as the corresponding type of active pixels, and perform the same type of readout operations as the corresponding type of active pixels.

While, in the example of FIG. 5, active pixel portion 104 is associated with active pixel rows 1 to N and active pixel portion 106 is active pixel rows (N+1) to M, there may be no structural differences between respective pixels in portions 104 and 106 (e.g., pixels may have the same elements, pixels may have the same coupling or connectivity between the elements, etc.). The separation between active pixel portions 104 and 106 may be defined by differences in how pixels in each portion are controlled and operated (e.g., by row control circuitry 26 and/or column readout circuitry 28 in FIG. 2). Similarly, respective pixels in OB pixel portions 114 and 116 may be structurally the same (e.g., may have the same element, may have the same coupling or connectivity between the elements, etc.) and may be defined by differences in how pixels in each portion are controlled and operated (e.g., by row control circuitry 26 and/or column readout circuitry 28 in FIG. 2).

In particular, OB pixels in portion 114 may be controlled and operated in the same manner as active pixels in portion 104. As an example, row control circuitry 26 and/or column readout circuitry 28 may control an active pixel in portion 104 by asserting and deasserting control signals for the active pixel in a particular manner (e.g., using a particular control scheme) over a time period (e.g., over an integration time period during which image charge is generated, over a readout time period during which image charge is read out, etc.). In this example, row control circuitry 26 and/or column readout circuitry 28 may also control a corresponding OB pixel in portion 114 (e.g., in the same column as the active pixel in this example) by asserting and deasserting the analogous control signals in the OB pixel in the same particular manner over the same time period (e.g., over an integration time period during which dark current charge is generated, over a readout time period during which the dark current charge is read out, etc.).

Because the active pixel and the corresponding OB pixel are in different rows, the corresponding readout operations will not occur simultaneously (e.g., there may be a temporal delay between the readout operation for the active pixel and the readout operation for the corresponding OB pixel). In contrast, the integration time period during which the image charge and the dark current charge are generated may be the same (e.g., may be shared globally across the array in a global shutter mode of operation).

In a similar manner, OB pixels in portion 116 may be controlled and operated in the same manner as active pixels in portion 106. As an example, row control circuitry 26 and/or column readout circuitry 28 may control an active pixel in portion 106 by asserting and deasserting control signals for the active pixel in a particular manner (using a particular control scheme) over a time period (e.g., over an integration time period during which image charge is generated, over a readout time period during which image charge is read out, etc.). In this example, row control circuitry 26 and/or column readout circuitry 28 may also control a corresponding OB pixel in portion 116 (e.g., in the same column as the active pixel in this example) by asserting and deasserting the analogous control signals in the OB pixel in the same particular manner over the same time period (e.g., over an integration time period during which dark current charge is generated, over a readout time period during which the dark current charge is read out, etc.).

Because the active pixel and the corresponding OB pixel are in different rows, the corresponding readout operations will not occur simultaneously (e.g., there may be a temporal delay between the readout operation for the active pixel and the readout operation for the corresponding OB pixel). In contrast, the integration time period during which the image charge and the dark current charge are generated may be the same (e.g., may be shared globally across the array in a global shutter mode of operation).

The configuration in FIG. 5 is merely illustrative. If desired, active pixels and/or OB pixels may be organized in any suitable manner based on the configuration of the image sensor. In configurations where the image sensor is operable in multiple operating modes and/or has multiplex settings, active pixels 102 may be split into different segments in different manners (e.g., based on different sets of rows) in real-time and in response to the switching of the operating modes (e.g., differences in the operating conditions of different sets of active pixels). In these configurations, OB pixels 112 may be split adaptively into corresponding OB pixel segments that are associated with the respective active pixel segments, thereby providing corresponding black level signals specifically suited for each corresponding active pixel segment.

Figure 6:
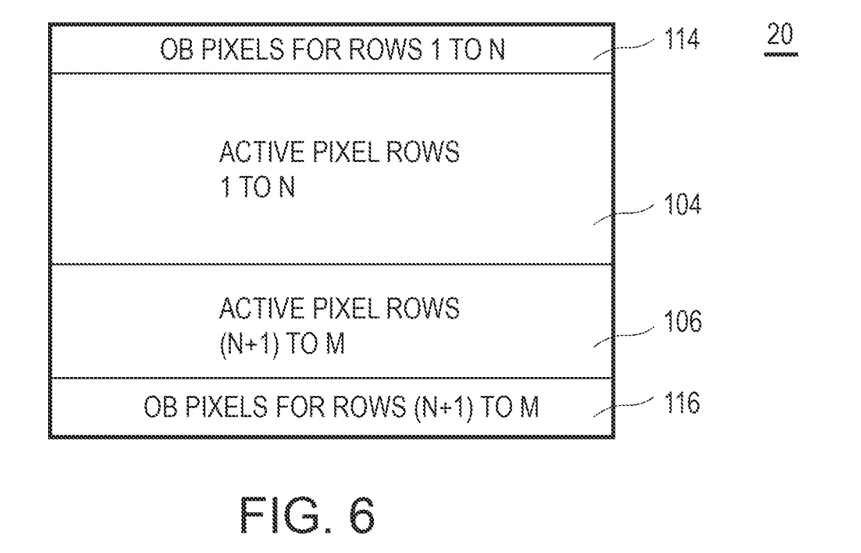
FIG. 6 is a diagram of an illustrative pixel array having separated portions of optically black pixels in accordance with some embodiments.

FIG. 6 is a diagram of an array 20 with illustrative placements of OB pixel portions and active pixels portions (e.g., described in connection with FIG. 5). As shown in FIG. 6, active pixel rows 1 to N forming active pixel portion 104 and active pixel rows (N+1) to M forming active pixel portion 106 may be formed at the center of array 20 (e.g., using the more central rows of an active pixel portion in array 20). OB pixel portions 114 and 116 may be split on respective sides of the active pixel rows (e.g., active pixel portion of array 20). In particular, OB pixel portion 114 for generating black level signals for active pixel portion 104 may be on the side of the active pixel portion in array 20 adjacent to active pixel portion 104. OB pixel portion 116 for generating black level signals for active pixel portion 106 may be on the side of the active pixel portion in array 20 adjacent to active pixel portion 106.

The configuration of array 20 in FIG. 6 is merely illustrative. If desired, OB pixel portions and active pixel portions may be placed at any suitable locations at array 20. As examples, all OB pixel portions may be placed on one side of the active pixel rows (e.g., all above active pixel portion 104, all below active pixel portion 106, etc.), one or more OB pixel portions may be interposed between active pixel rows, etc. If desired, array 20 may be a discontinuous array (e.g., an array having gaps absent of pixels, an array formed on multiple substrates, etc.) having one or more corresponding active pixel portions and/or one or more corresponding OB pixel portions on each continuous portion of the discontinuous array.

While FIGS. 5 and 6 show two active pixel portions and two OB pixel portions each associated with one or more sets of entire pixel rows, this is merely illustrative. More generally, configurations in which an array has active pixels (e.g., pixel 22 of FIG. 3) operable in a global shutter mode where readout conditions between the pixels differ to form different segments are described herein as illustrative examples. The embodiments described herein may similarly apply to arrays having sets of pixels that generally operate in different manners for image charge integration operations, readout operations, or for other operations. In particular, tiled image sensors having one or more tiled image sensor arrays, where each tile of pixels processes information differently or in different manners based on the image scene content of the particular tile may include an OB pixel portion for each tile. As an example, each tile of pixels may be configured to generate a corresponding image portion having a different resolution, having a different dynamic range, etc. OB pixels in the corresponding OB pixel portions may mimic the operations (e.g., the processing) of information in the respective tiles of active pixels. As a particular illustrative example (e.g., for automotive applications), the tiled image sensor may include a lower portion (e.g., a first tile of pixels) having more sensitivity for lower illumination and an upper portion (e.g., a second tile of pixels) having better color and crosstalk performance for higher illumination.

Figure 7:
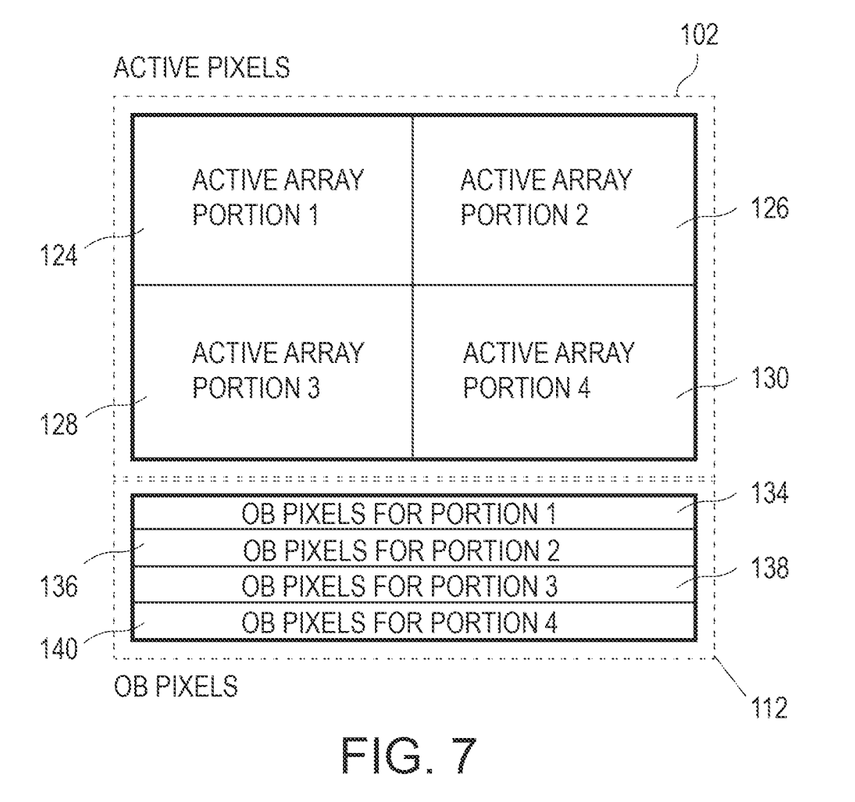
FIG. 7 is a diagram of illustrative portions of optically black pixels for corresponding portions of an active pixel array in accordance with some embodiments.

As shown in the example of FIG. 7, active pixels 102 may be organized into different tiles such as active array portions 124, 126, 128, and 130. These tiles or portions may organize at any location across the pixel array (e.g., may span entire rows, may only partially span rows, may span entire columns, may only partially span column, etc.). In the example of FIG. 7, active array portions 124, 126, 128, 130 may each span a rectangular portion of the pixel array. However, if desired, one or more of active array portions 124, 126, 128, 130 may include any suitable pixels in the pixel array (e.g., may span a non-rectangular portion of the pixel array, may include non-adjacent pixels, etc.).

OB pixels 112 may be organized in corresponding OB pixel portions 134, 136, 138, and 140. While in the example of FIG. 7, OB pixel portions 134, 136, 138, and 140 are shown as one or more complete rows, this is merely illustrative. If desired, each OB pixel portion may only partially span each row (e.g., the combination of pixel portions 134 and 136 may span one or more complete rows and the combination of pixel portions 138 and 140 may span one or more complete rows, similar to the active array portions). If desired, OB pixel portions may include any suitable OB pixels in the pixel array (e.g., may span a non-rectangular portion of the pixel array, may include non-adjacent pixels, etc.). If desired, the OB pixel portions 136, 138, and 140 may be disposed on the pixel array in any suitable manner relative to the active pixel portions (e.g., may be separated, may form a continuous block of OB pixels, etc.).

Each OB pixel in portion 134 may structurally the same as each active pixel in portion 124. OB pixels in portion 134 may be operated in the same manner as active pixels in portion 124 (e.g., may receive control signals asserted and deasserted in a the same control scheme as corresponding control signals in the active pixels, may have the same integration time to generate image charge for the active pixels and to generate dark current charge for the OB pixels, may operate using the same resolution settings or conditions, may operate using the same dynamic range settings or conditions, etc.). In such a manner, black level signals (corresponding to dark current charge) generated by OB pixels in portion 134 may more accurately correct for dark current noise specific to image signals generated by active pixels in portion 124.

Similarly, each OB pixel in portion 136 may structurally the same as each active pixel in portion 126. OB pixels in portion 136 may be operated in the same manner as active pixels in portion 126. In such a manner, black level signals generated by OB pixels in portion 136 may more accurately correct for dark current noise specific to image signals generated by active pixels in portion 126. Each OB pixel in portion 138 may structurally the same as each active pixel in portion 128. OB pixels in portion 138 may be operated in the same manner as active pixels in portion 128. In such a manner, black level signals generated by OB pixels in portion 138 may more accurately correct for dark current noise specific to image signals generated by active pixels in portion 128. Each OB pixel in portion 140 may structurally the same as each active pixel in portion 130. OB pixels in portion 140 may be operated in the same manner as active pixels in portion 130. In such a manner, black level signals generated by OB pixels in portion 140 may more accurately correct for dark current noise specific to image signals generated by active pixels in portion 130.

In some instances, active pixels 102 across the active pixel array portions (and therefore OB pixels 112 across corresponding OB pixel array portions) may have the same pixel configuration (e.g., pixels may have the same elements, the same coupling or connectivity, etc.). In other instances, active pixels 102 across two or more active pixel array portions (and therefore OB pixels 112 across corresponding OB pixel array portions) may have different pixel configurations (e.g., portions 124 and 134 may have different pixel configurations than portions 128 and 138, portions 124 and 134 may have different pixel configurations than portions 126 and 136, etc.). In either of these instances, row control circuitry 26 and/or column readout circuitry 28 may operate active pixels 102 across the active pixel array portions (and therefore OB pixels 112 across corresponding OB pixel array portions) in different manners (e.g., using different timings for different control schemes defined by the assertion and deassertion of control signals).

Figure 8:
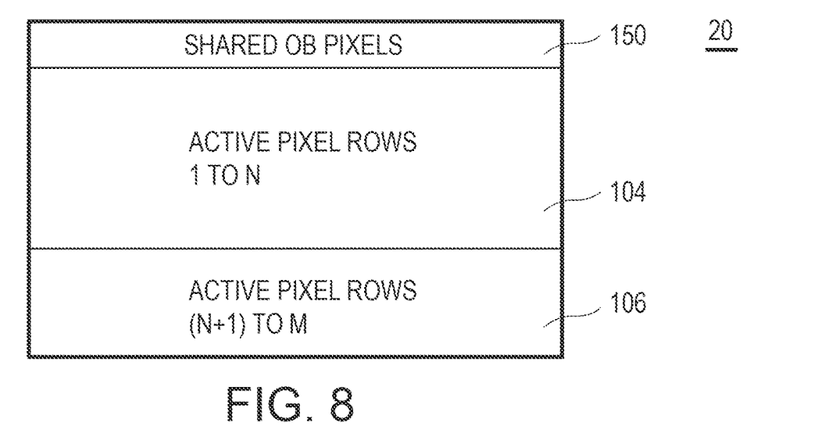
FIG. 8 is a diagram of an illustrative pixel array implemented with a shared set of optically black pixels for different sets of active pixels in accordance with some embodiments.

The examples of FIGS. 5-7 disclosing a same number of OB pixel portions as active pixel portions are merely illustrative. If desired, one or more sets of OB pixels may be shared by multiple active pixel portions. FIG. 8 is a diagram of an illustrative pixel array 20 having a shared OB pixel portion for two active pixel portions or segments. In the example of FIG. 8, shared OB pixels in portion 150 may be configured to generate black level signals for both active pixel portions 104 and 106.

In this configuration, row control circuitry 26 and/or column readout circuitry 28 (FIG. 2) may operate shared OB pixels in portion 150 in the same condition as (e.g., in the same manner as) active pixels in portion 104 to generate black level signals in this first condition. Row control circuitry 26 and/or column readout circuitry 28 may perform readout operations on this first set of black level signals generated in the first condition and use the first set of black level signals to perform black level correction for active pixels in portion 104. Additionally, for the same image frame, row control circuitry 26 and/or column readout circuitry 28 (FIG. 2) may also operate shared OB pixels in portion 150 in the same condition as (e.g., in the same manner as) active pixels in portion 106 to generate black level signals in this second condition. Row control circuitry 26 and/or column readout circuitry 28 may perform readout operations on this second set of black level signals generated in the second condition and use the second set of black level signals to perform black level correction for active pixels in portion 106.

By generating two different sets of black level signals (separately read out during nonoverlapping time periods), OB pixels in portion 150 may be shared by both active pixel portions 104 and 106. The two separate readout operations may occur at any suitable time with respect to the readout operations for the different rows of active pixels.

The example of FIG. 8 is merely illustrative. If desired, the shared OB pixels in portion 150 may be placed at any suitable location in array 20. If desired, array 20 may include one or more shared OB pixel portions and/or one or more dedicated OB pixel portions (e.g., an array having four active array portions and three OB pixel portions, one of which is shared by two active array portions). If desired, each OB pixel portion may be shared by any suitable number of different active pixel portions (e.g., the same shared OB pixel portion may gather dark current charge and perform corresponding readout operations for each of the different active pixel portions).

Figure 9:
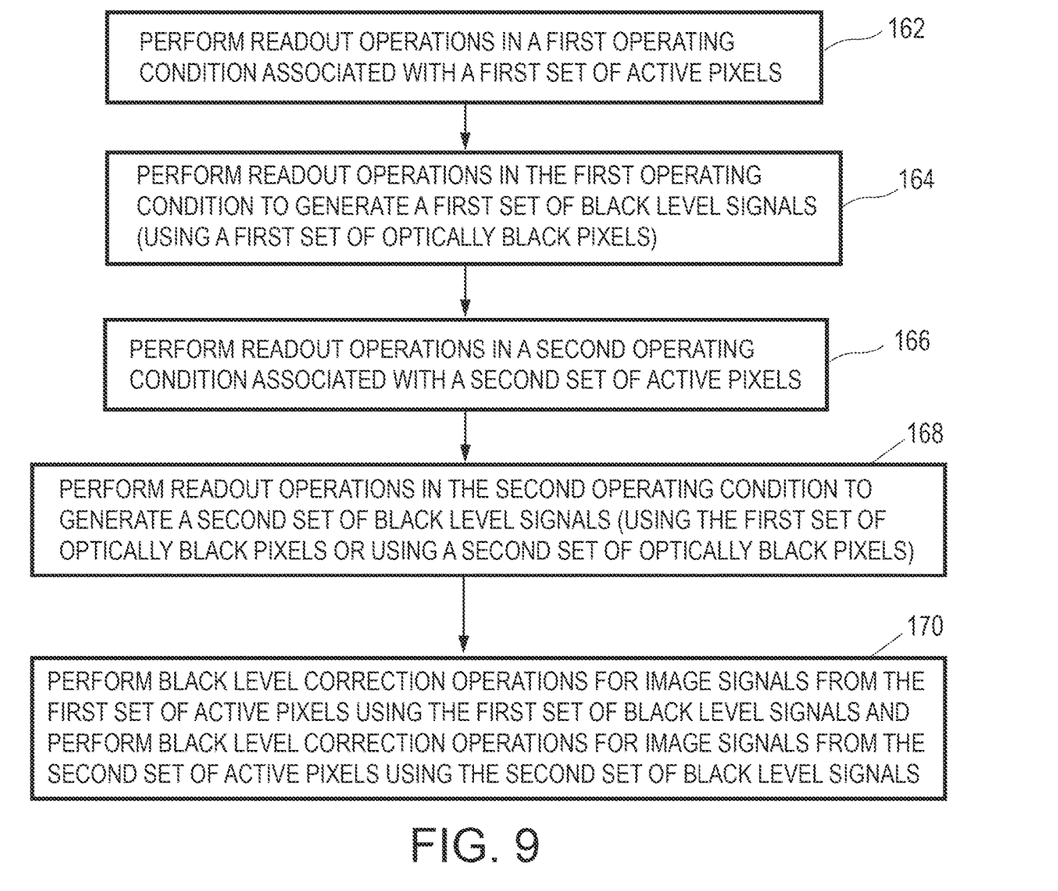
FIG. 9 is a flowchart of illustrative steps for adaptively performing black level correction operations for different sets of active pixels in accordance with some embodiments.

FIG. 9 is an illustrative flowchart for performing black level correction operations for different active pixel portions (e.g., different tiles, different sets of rows, different segments, etc.) in a pixel array. In general, control circuitry for the pixel array (e.g., row control circuitry 26, column readout circuitry 28, and/or control and processing circuitry 24 in FIG. 2) may be configured to control active and OB pixels in the pixel array to perform the illustrative steps in FIG. 9. As an example, the control circuitry may include storage circuitry (e.g., non-transitory computer readable medium) for storing (software/firmware) instructions that control pixels in the pixel array and may include processing circuitry to process these instructions to perform the illustrative steps in FIG. 9.

As shown in FIG. 9, at step 162, the control circuitry may control a first set of active pixels to perform readout operations in a first operating condition or environment (e.g., using a first control scheme).

At step 164, the control circuitry may control a first set of OB pixels to perform readout operations in the first operating condition or environment to generate a first set of black level signals.

At step 166, the control circuitry may control a second set of active pixels to perform readout operations in a second operating condition or environment (e.g., using a second control scheme).

At step 168, the control circuitry may control a second set of OB pixels (or the same first set of OB pixels in a shared scheme) to perform readout operations in the second operating condition or environment to generate a second set of black level signals.

At step 170, the control circuitry (e.g., signal processing circuitry in the control circuitry) may perform black level correction operations for image signals from the first set of active pixels using the first set of black level signals and may perform black level correction operations for image signals from the second set of active pixels using the second set of black level signals. As an example, a black level correction operation may be implemented by subtracting a corresponding black level signal from a respective image signal. If desired, the black level signal and/or image signal may be processed or modified before the subtraction operation.

These steps in FIG. 9 are merely illustrative. If desired, one or more of steps 162, 164, 166, 168, and 170 may occur in a different order (e.g., the first portion of step 170 may occur before step 166, step 166 may occur before step 164, etc.). If desired, one or more portions of these steps 162, 164, 166, 168, and 170 may occur simultaneously. If desired, any suitable modifications may be made to the flowchart of FIG. 9 (e.g., additional readout operations for additional sets of black level signals and additional black level correction operations may be performed for additional sets of active pixels).

While the flowchart of FIG. 9 describes steps relating to differing conditions associated with perform readout operations (e.g., similar to the description in connection with FIG. 4), this is merely illustrative. If desired, in some systems or configurations (e.g., in the configuration of FIG. 7), step 162 may be generally adapted to generate a first set of image signals from a first set of active pixels when operated in a first operating condition or mode (e.g., using a first control scheme, associated with a first resolution, associated with a first dynamic range, associated with a first tile of pixels, associated with a first integration time, etc.), step 164 may be generally adapted to generate a first set of black level signals from a first set of OB pixels when operated in the first operating condition or mode, step 166 may be generally adapted to generate a second set of image signals from a second set of active pixels when operated in a second operating condition or mode (e.g., using a second control scheme, associated with a second resolution, associated with a second dynamic range, associated with a second tile of pixels, associated with a second integration time, etc.), and step 168 may be generally adapted to generate a second set of black level signals from a second set of OB pixels (or the same first set of OB pixels in a shared scheme) when operated in the second operating condition or mode.

Various embodiments have been described illustrating systems and methods for reducing noise in image signals generated by different active pixel portions in a pixel array.

As an example, an image sensor may include an image sensor pixel array having active pixels and dark pixels, row control circuitry, and column readout circuitry. The row control circuitry (in combination with column readout circuitry) may be configured to: control a first set of the active pixels in a first operating condition to generate a first set of image signals, control a first set of the dark pixels in the first operating condition to generate a first set of black level signals for the first set of image signals, control a second set of the active pixels in a second operating condition to generate a second set of image signals, and control a second set of the dark pixels in the second operating condition to generate a second set of black level signals for the second set of image signals. The first set of the dark pixels may form at least one pixel row in the image sensor pixel array, and the second set of the dark pixels may form at least one pixel row in the image sensor pixel array. The first set of the active pixels may form a first set of pixels rows in the image sensor pixel array, and the second set of active pixels may form a second set of pixel rows in the image sensor pixel array.

If desired, the row control circuitry may be configured to control the first set of the active pixels and the first set of dark pixels in the first operating condition by performing readout operations on the first set of image signals and the first set of black level signals while an anti-blooming transistor in each of the first set of active pixels and in each of the first set of dark pixels is in an asserted state. If desired, the row control circuitry may be configured to control the second set of the active pixels and the second set of dark pixels in the second operating condition by performing additional readout operations on the second set of image signals and the second set of black level signals while the anti-blooming transistor in each of the second set of active pixels and in each of the second set of dark pixels is in a deasserted state.

If desired, each of the active pixels and the dark pixels may have a same pixel configuration. In particular, each of the active pixels and the dark pixels may include a photosensitive element, a floating diffusion region, and a local charge storage region, and the row control circuitry may be configured to operate the active pixels and the dark pixels in a global shutter mode of operation.

If desired, the first and second sets of dark pixels may form a shared set of dark pixels. If desired, the row control circuitry may be configured to control the first and second sets of the dark pixels in the first operating condition to generate the first set of black level signals for the first set of image signals during a first time period and may be configured to control the first and second sets of the dark pixels in the second operating condition to generate the second set of black level signals for the second set of image signals during a second time period.

As another example, a method for black level correction of image signals may include: controlling a first set of active image sensor pixels using a first control scheme to generate a first set of image signals, controlling a second set of active image sensor pixels using a second control scheme to generate a second set of image signals, controlling optically shielded image sensor pixels using the first control scheme to generate a first set of black level signals, controlling the optically shielded image sensor pixels using the second control scheme to generate a second set of black level signals, performing black level correction operations for the first set of image signals using the first set of black level signal; and performing additional black level correction operations for the second set of image signals using the second set of black level signals.

In one instance, the first set of black level signals may be generated during a first time period, and the second set of black level signals may be generated during a second time period. In another instance, a first set of the optically shielded image sensor pixels may generate the first set of black level signals, and a second set of the optically shielded image sensor pixels may generate the second set of black level signals.

If desired, the first and second sets of active image sensor pixels may each span entire rows across an active pixel portion of an image sensor array. If desired, the first and second sets of active image sensor pixels may each only partially span rows across an active pixel portion of an image sensor array.

As yet another example, a method for black level correction of image signals may include: controlling a first set of active image sensor pixels to generate a first set of image signals by processing an image scene in a first manner, controlling a second set of active image sensor pixels to generate a second set of image signals by processing the image scene in a second manner, controlling a first set of dark image sensor pixels to generate a first set of black level signals by mimicking the processing of the image scene in the first manner, controlling a second set of dark image sensor pixels to generate a second set of black level signals by mimicking the processing of the image scene in the second manner, performing black level correction operations for the first set of image signals using the first set of black level signal, and performing additional black level correction operations for the second set of image signals using the second set of black level signals. If desired, processing the image scene in the first and the second manners is associated with a difference in dynamic range or a difference in resolution.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
   an image sensor pixel array having active pixels and dark pixels; and
   row control circuitry coupled to the active pixels and the dark pixels and configured to:
   control a first set of the active pixels in a first operating condition to generate a first set of image signals,
   control a first set of the dark pixels in the first operating condition to generate a first set of black level signals for the first set of image signals,
   control a second set of the active pixels in a second operating condition to generate a second set of image signals, and
   control a second set of the dark pixels in the second operating condition to generate a second set of black level signals for the second set of image signals, wherein the first and second sets of active pixels and the first and second sets of dark pixels each comprise a transistor and wherein the transistor is in a first state in the first operating condition and is in a second state in the second operating condition.

2. The image sensor defined in claim 1, wherein the first set of the dark pixels form at least one pixel row in the image sensor pixel array and the second set of the dark pixels form at least one pixel row in the image sensor pixel array.

3. The image sensor defined in claim 2, wherein the first set of the active pixels form a first set of pixels rows in the image sensor pixel array and the second set of active pixels form a second set of pixel rows in the image sensor pixel array.

4. The image sensor defined in claim 1, wherein the row control circuitry is configured to control the first set of the active pixels and the first set of dark pixels in the first operating condition by performing a readout operation on each of the first set of image signals and the first set of black level signals while the transistor in a corresponding one of the first set of active pixels and the first set of dark pixels is in the first state.

5. The image sensor defined in claim 4, wherein the row control circuitry is configured to control the second set of the active pixels and the second set of dark pixels in the second operating condition by performing an additional readout operation on each of the second set of image signals and the second set of black level signals while the transistor in a corresponding one of the second set of active pixels and the second set of dark pixels is in the second state.

6. The image sensor defined in claim 1, wherein the transistor is an anti-blooming transistor.

7. The image sensor defined in claim 6, wherein the first state is an asserted state of the anti-blooming transistor and the second state is a deasserted state of the anti-blooming transistor.

8. The image sensor defined in claim 1, wherein each of the active pixels and the dark pixels has a same pixel configuration.

9. The image sensor defined in claim 1, wherein each of the active pixels and the dark pixels includes a photosensitive element, a floating diffusion region, and a local charge storage region, and the row control circuitry is configured to operate the active pixels and the dark pixels in a global shutter mode of operation.

10. The image sensor defined in claim 1, wherein the first and second sets of dark pixels form a shared set of dark pixels, and wherein the row control circuitry is configured to control the first and second sets of the dark pixels in the first operating condition to generate the first set of black level signals for the first set of image signals during a first time period and is configured to control the first and second sets of the dark pixels in the second operating condition to generate the second set of black level signals for the second set of image signals during a second time period.

11. A method for black level correction of image signals, the method comprising:
    controlling a first transistor of each active image sensor pixel in a first set of active image sensor pixels using a first control scheme to generate a first set of image signals, wherein the first transistor is in a first state in the first control scheme;
    controlling a second transistor of each active image sensor pixel in a second set of active image sensor pixels using a second control scheme to generate a second set of image signals, wherein the second transistor is in a second state in the second control scheme;
    controlling at least some transistors of optically shielded image sensor pixels to be in the first state using the first control scheme to generate a first set of black level signals;
    controlling at least some transistors of the optically shielded image sensor pixels to be in the second state using the second control scheme to generate a second set of black level signals;
    performing black level correction operations for the first set of image signals using the first set of black level signal; and
    performing additional black level correction operations for the second set of image signals using the second set of black level signals.

12. The method defined in claim 11, wherein controlling at least some transistors of the optically shielded image sensor pixels using the first control scheme to generate the first set of black level signals comprises controlling a given transistor of the optically shielded image sensor pixels to be in the first state during a first time period, and controlling at least some transistors of the optically shielded image sensor pixels using the second control scheme to generate the second set of black level signals comprises controlling the given transistor of the optically shielded image sensor pixels to be in the second state during a second time period.

13. The method defined in claim 11, wherein controlling at least some transistors of the optically shielded image sensor pixels using the first control scheme to generate the first set of black level signals comprises controlling a first transistor of each optically shielded image sensor pixel in a first set of the optically shielded image sensor pixels to be in the first state to generate the first set of black level signals, and controlling at least some transistors of the optically shielded image sensor pixels using the second control scheme to generate the second set of black level signals comprises controlling a second transistor of each optically shielded image sensor pixel in a second set of the optically shielded image sensor pixels to be in the second state to generate the second set of black level signals.

14. The method defined in claim 11, wherein controlling the first transistors of the first set of active image sensor pixels using the first control scheme to generate the first set of image signals and controlling the second transistors of the second set of active image sensor pixels using the second control scheme to generate the second set of image signals comprises operating the first and second sets of active image sensor pixels in a global shutter mode of operation.

15. The method defined in claim 11, wherein the first state is an asserted state and wherein the second state is a deasserted state.

16. The method defined in claim 11, wherein the first and second sets of active image sensor pixels each span entire rows across an active pixel portion of an image sensor array.

17. The method defined in claim 11, wherein the first and second sets of active image sensor pixels each only partially extend across rows in an active pixel portion of an image sensor array.

18. A method for black level correction of image signals, the method comprising:
controlling a first set of active image sensor pixels to generate a first set of image signals with a first characteristic;
controlling a second set of active image sensor pixels to generate a second set of image signals with a second characteristic;
controlling a first set of dark image sensor pixels to generate a first set of black level signals with the first characteristic by mimicking the generation of the first set of image signals;
controlling a second set of dark image sensor pixels to generate a second set of black level signals with the second characteristic by mimicking the generation of the second set of image signals, wherein the first and second characteristics have differing dynamic ranges or resolutions;
performing black level correction operations for the first set of image signals using the first set of black level signal; and
performing additional black level correction operations for the second set of image signals using the second set of black level signals.

19. The method defined in claim 18, wherein the first and second characteristics have differing dynamic ranges, and wherein an image formed from the first and second sets of image signals has image portions with different dynamic ranges.

20. The method defined in claim 18, wherein the first and second characteristics have differing resolutions, and wherein an image formed from the first and second sets of image signals has image portions with different resolutions.

* * * * *